Dec. 19, 1961   F. W. MILLER ET AL   3,013,433
LIQUID LEVEL GAUGE AND THE LIKE
Filed June 13, 1957   3 Sheets-Sheet 3
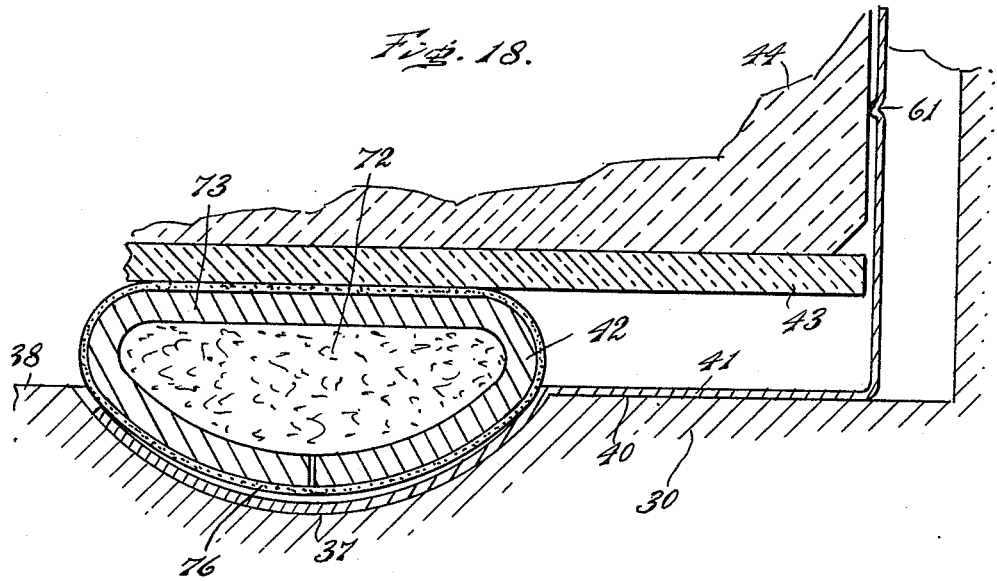
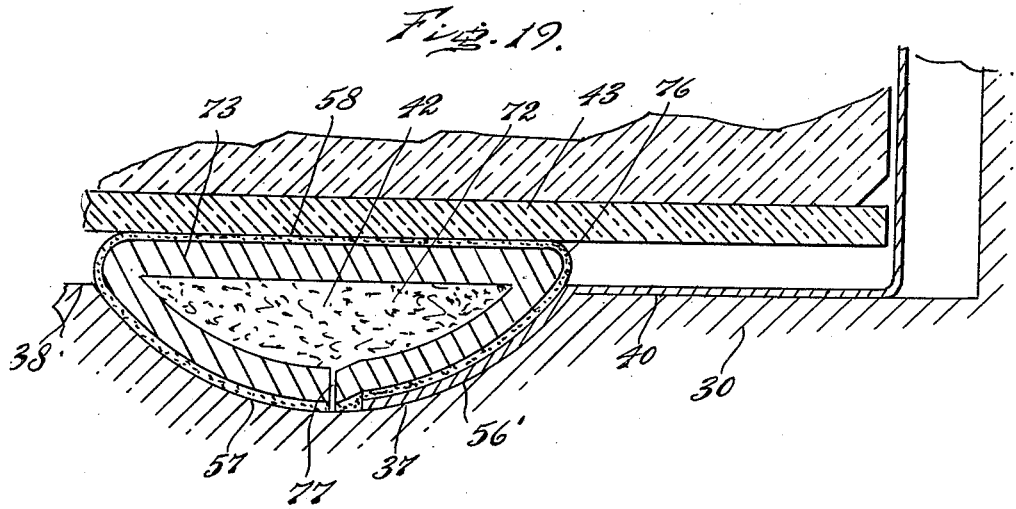
INVENTORS
Frank W. Miller
Robert D. Neyer
BY
ATTORNEYS.

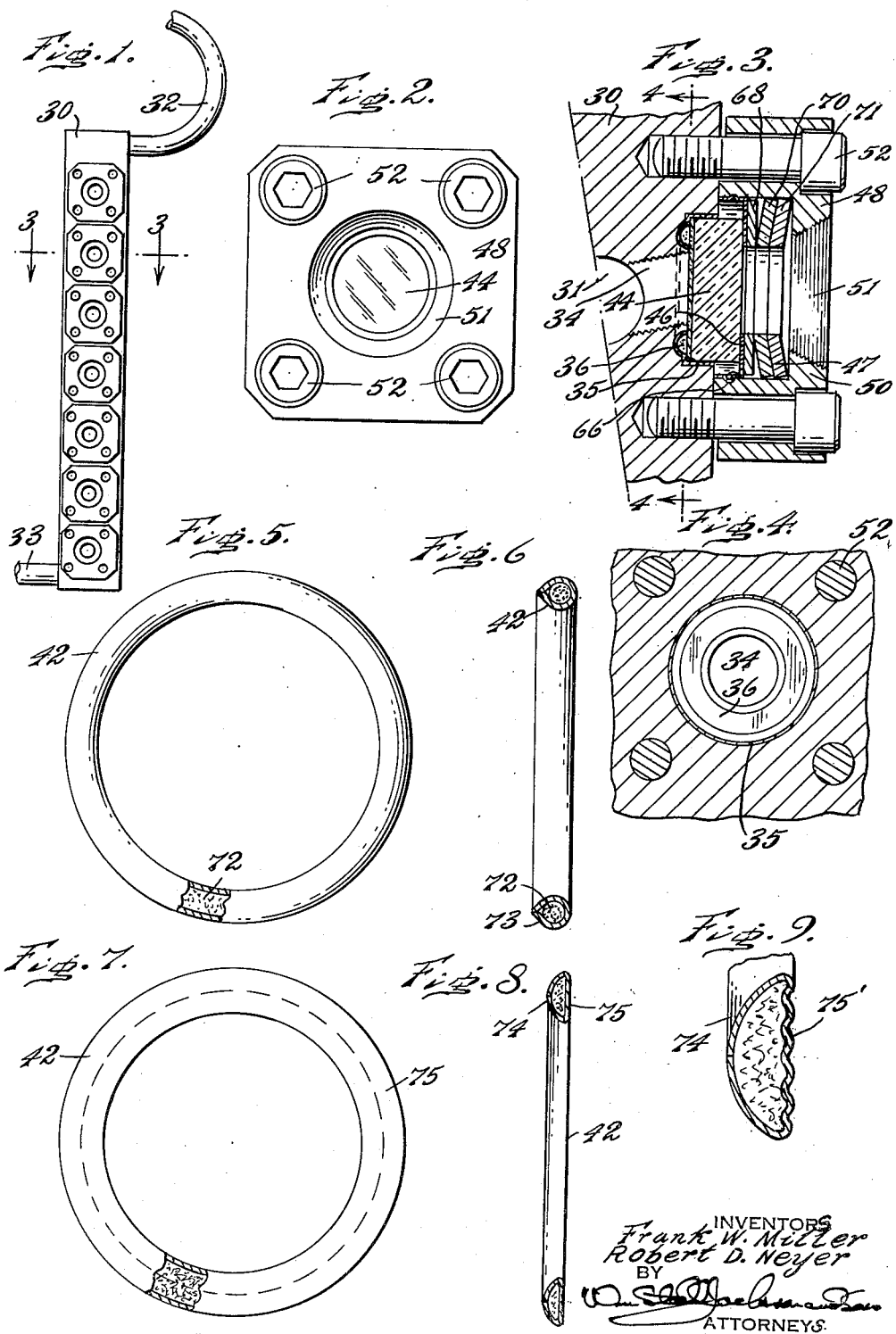

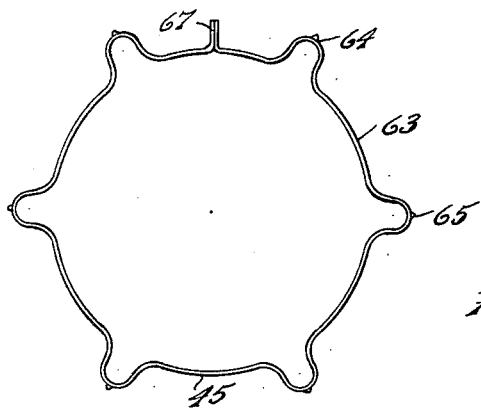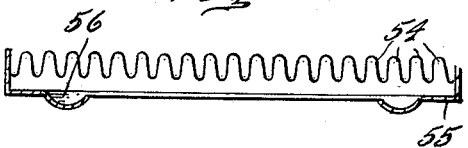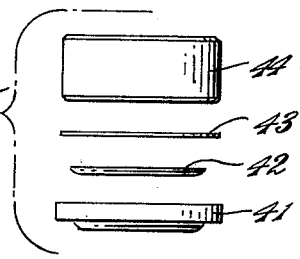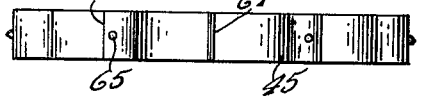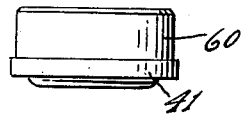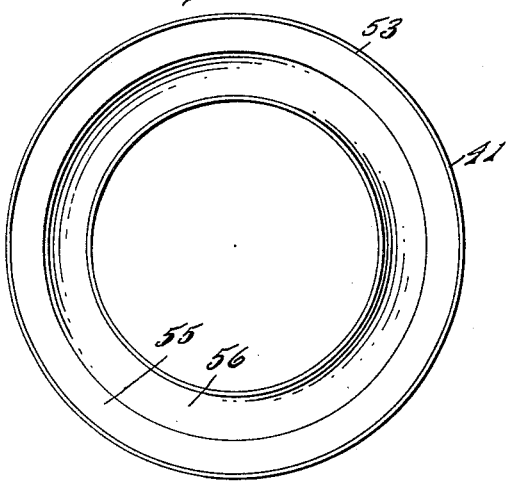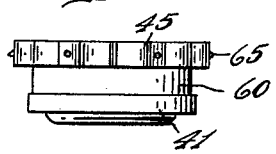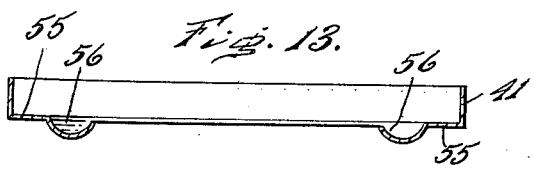

United States Patent Office 3,013,433
Patented Dec. 19, 1961

3,013,433
LIQUID LEVEL GAUGE AND THE LIKE
Frank W. Miller, Lavrock, and Robert D. Neyer, Oreland, Pa., assignors to Yarnall-Waring Company, Philadelphia, Pa., a corporation of Pennsylvania
Filed June 13, 1957, Ser. No. 665,467
10 Claims. (Cl. 73—330)

The present invention relates to window construction of liquid level gauges, including window units and gasket rings therefor.

A purpose of the invention is to permit quicker and safer replacement of gauge glasses or windows in liquid level gauges under operating conditions.

A further purpose is to establish and maintain relation of a gasket ring, window element, and desirably also of a window cap and spring means, so that these components can be inserted and removed as a unit.

A further purpose is to extend the retaining ring radially inwardly around at least a portion of the curved contour of the gasket ring so as to hold and position the gasket ring on the window element during assembly.

A further purpose is to use the retaining ring to hold the gasket ring in proper relation to the mica and the mica in proper relation to the glass window of the gauge preliminary to assembly.

A further purpose is to make the gasket ring more readily removable and avoid the need for scraping the seat surface when the gasket ring is removed.

A further purpose is to enclose the fibrous cushioning material of the gasket ring in a sheet metal envelope preferably of a relatively soft metal such as copper, or a copper base alloy, and desirably also to apply a layer of even sofeter metal, preferably silver or gold (or where the gasket is a harder alloy, the plating may be copper), on the outside of the metallic envelope of the gasket ring so as to promote better sealing in spite of slight discontinuities in the surfaces engaged.

A further purpose is to prevent seepage of liquid into the gasket cushioning material by the sheet metal envelope.

Further purposes appear in the specification and in the claims.

In the drawings, we have chosen to illustrate a few only of the numerous embodiments in which the invention may appear, selecting the forms shown from the standpoints of convenience in illustration, satisfactory operation, and clear demonstration of the principles involved.

FIGURE 1 is a front elevation of a liquid level gauge of the present invention.

FIGURE 2 is an enlarged front elevation showing a portion of the gauge of FIGURE 1.

FIGURE 3 is a fragmentary section on the line 3—3 of FIGURE 1 to enlarged scale.

FIGURE 4 is a section on the line 4—4 of FIGURE 3.

FIGURE 5 is an elevation partly broken away showing the gasket ring of the invention in the process of manufacture.

FIGURE 6 is a central transverse section of the gasket ring of FIGURE 5.

FIGURE 7 is an elevation partly broken way showing the completed gasket ring of the invention.

FIGURE 8 is a transverse section of the gasket ring of FIGURE 7.

FIGURE 9 is a fragmentary view corresponding to a portion of FIGURE 8 and showing a modification.

FIGURE 10 is a front elevation showing a spacing spring employed in the present invention.

FIGURE 11 is a side elevation of the spacing spring of FIGURE 10.

FIGURE 12 is a front elevation of a retaining ring employed in the present invention.

FIGURE 13 is a transverse section of the retaining ring of FIGURE 12.

FIGURE 14 is a fragmentary transverse section showing a variation in the retaining ring of FIGURE 12.

FIGURE 15 is an exploded side elevation showing the components used in assembling the window unit of the invention.

FIGURE 16 is a side elevation showing the completely assembled window unit prior to application of the spacing spring and cover.

FIGURE 17 is a side elevation showing the window unit with the spacing spring and cover assembled together.

FIGURE 18 is a transverse section to enlarged scale showing the window unit in place in the gauge, before pressure is applied.

FIGURE 19 is a view similar to FIGURE 18 showing a variation, but after application of pressure to seal.

In the prior art in order to replace a gauge glass, it has been necessary to disassemble the elements and separately assemble the same at the gauge. The difficulty of this procedure will be understood when it is recognized that a water gauge on a modern high pressure steam boiler operates at a temperature approaching 700° F., and the prevailing temperature at the gauge location may often exceed 100° F. It is extremely uncomfortable and oppressive for a serviceman to remain in such a location for any extended period of time. The serviceman who must perform the operations of replacing the gauge glass is under an urge to complete his job as quickly as possible. This often leads to neglect of the best practice, particularly with regard to complete elimination of foreign particles between the fitted parts. A reduction in service life of the replacement may then often occur.

One of the great advantages of the present invention is that the components which must be employed in replacing the gauge glass are preassembled into a window unit, with a great saving in the time which the serviceman must spend at the boiler location, and also with assurance that the components are assembled carefully and free from foreign particles.

In accordance with one aspect of the invention, the gauge glass, the mica protecting sheet, the gasket ring and preferably also the cover are assembled together as a unit which assures correct alignment and positioning and retains all of the parts together.

In accordance with another aspect of the invention, a gasket ring is made up which is protected against seepage of steam or other fluid by a thin flexible metallic envelope preferably covered with a soft metal layer of the type of silver or gold.

The gauge of the invention suitably comprises a gauge body 30 of steel or the like having a vertical interior passage 31 connected at the top to the steam space by a pipe 32 and at the bottom to the water space of the boiler by a pipe 33. At intervals the gauge is provided with window openings 34.

At each window opening at the outside there is a window recess 35 suitably a socket and at the bottom of the recess 35 there is an annular sealing recess 36 of semicircular cross section directed outwardly. Radially inside this circular recess 37 there is suitably a flat portion 38, and radially outside there is suitably a flat portion 40, as best seen in FIGURES 18 and 19.

Beginning at the body, in the sealing recess of the assembled gauge, as best seen in FIGURES 3 and 18, there is a sheet metal retaining ring 41, then a gasket ring 42, then a mica sheet 43, then a glass disk 44, a spacing spring 45 around the glass disk suitably outside the retaining ring, then a load distributing or cushion ring 46 backed by a load distributing ring on the outside of the glass disk, backed by the ring 68, and then a series of Belleville springs or dished washers 47, and finally a cover 48 having a flange 50 which extends in over the Belleville springs and having a window opening 51 which is in line with the transparent line of sight through the window glass and mica and the window opening 34. The cover is secured to the gauge body by bolts 52 threaded into the body.

The retaining ring 41 is of thin sheet metal in the range of thickness between 0.0005 and 0.005 inch and preferably about 0.002 inch thick. Stainless steel either of the straight chromium or of the chromium-nickel grade has been found satisfactory for this component. The retainer ring has an annular portion 53 which hugs and grips around the outside of the glass disk and which in the form of FIGURE 14 has spring fingers 54 which grip the outside of the disk.

The retaining ring is inwardly flanged to form a straight inwardly extending portion 55 at the end and then has an inwardly annularly extending portion of curved or semicircular cross section 56 which sets into the annular recess 37.

The gasket ring 42 is of endless ring form, and has a semicircular or curved portion 57 which conforms generally to the curvature of the annular recess 37 and the curved portion 56 of the retainer ring, and at the opposite face has a suitably flat portion 58 which engages one of the flat surfaces of the mica disk 43, the mica disk engaging one of the flat surfaces of the glass disk 44.

The retainer ring thus holds together in preassembled relationship the glass disk 44, the mica disk 43 and the gasket ring 42, the parts being shown disassembled in FIGURE 15 and assembled into a window unit 60 in FIGURE 16.

While in the preferred embodiment as shown in FIGURE 18 the retaining ring 41 extends in over at least 80 percent of the radial cross section of the gasket ring, it in some cases is not necessary to extend the retaining ring in this far, and in the form of FIGURE 19, the retaining ring has a partially semicircular portion 56′ which extends in at least 40 percent of the radial cross section of the gasket ring.

The retaining ring has the function of centering the gasket ring, and since the mica closely conforms to the interior of the retaining ring, it also positions the mica properly. In assembly care is used to be sure that all foreign particles are removed between the glass and the mica as otherwise there may be damage to the mica when the mica is forced against the glass under heavy pressure.

The retaining ring may suitably be provided with dimples 61 to assure a good engaging grip on the glass.

The window unit just described is held in proper spaced relation to the inner recess of the cover by the spring 45 which has segmental portions 63 and outwardly protruding ear portions 64, the segmental portions gripping the circumferential outside of the glass disk and the ear portions gripping the inside of the socket or recess in the cover. The ear portions are suitably provided with dimples 65 which snap into dimple recesses 66 of dual positions around the interior of the cover. The spring 45 is desirably made of a strip which is joined together at 67 as by riveting, seaming or welding as desired.

The glass disk at the outside has suitably cemented thereon the cushioning washer 46 which then engages the Belleville spring combination 47 which suitably consists of a flat washer 68 and a suitable combination of disk washers 70 and 71 which form no part of the present invention, but are the subject matter of Yarnall U.S. patent application Serial No. 566,434, filed February 20, 1956, for Liquid Level Gauge, now U.S. Patent 2,882,730.

The preassembly of the cover with the Belleville spring component and the window components serve to properly center the window components and hold all of the parts together preparatory for assembly.

The preassembled parts can be shipped and moved about without danger of disassembly and substituted directly for previous components in a gauge merely by removing the four cover bolts and then reapplying the cover bolts.

One of the great advantages of the present invention is that the components can be removed and replaced without the usual scraping and cleaning required where prior art nonmetallic gaskets have been used without the retainer ring. Such nonmetallic gaskets tend to develop tight adherences to the metal surfaces and are difficult to remove. Their removal requires delay and is likely to leave adhering particles which cause excess pressure and may result in premature failures.

The assembly of the present invention can be removed without difficulty through adherence and there is therefore no need to spend time or use special tools to remove spent parts of the gauge. Also there is therefore much less danger of damage to the seat of the gauge body. In prior practice there has been a tendency to score the seat, which has greatly impaired the service life of the gauge.

It will be evident, of course, that it is immaterial from the standpoint of the present invention whether the retaining ring is physically separate from or a part of the gasket, and also it will be evident that a wide variety of different forms of retaining rings and gaskets can be employed.

The gasket ring of the present invention is desirably made by using a cushioning center of heat-resistance fibrous material, preferably asbestos millboard 72, and surrounding it with a thin sheet metal layer preferably of copper or of copper base alloy, such as Monel, bronze or beryllium copper having a thickness of between 0.005 and 0.015 inch, preferably about 0.010 inch, as shown at 73.

The preferred method of manufacture is to cut out a ring of the fibrous cushioning material and form around it a ring of the metal sheet 73 suitably of circular cross section as shown in FIGURES 5 and 6 and then by using suitable dies form one side into a semicircular cross section 74 and the other side into a flat formation 75 as shown in FIGURES 7 and 8.

In some cases it is desirable to provide annular serrations 75′ in the flat surface as shown in FIGURE 9, these serrations flattening out under pressure to a considerable extent and serving to concentrate the sealing areas against the mica. This affords greater assurance against leakage than uniform loading of the entire gasket area.

The outside of the finished gasket is desirably coated with a soft metal compared to the metal of the gasket, and which will stand the temperature and the corrosion conditions as indicated at 76, suitable examples being electroplated silver or electroplated gold to a thickness of between 0.0005 and 0.005 inch. Where the gasket metal is a harder copper base alloy such as Monel, the plating may be copper. This tends to fill surface irregularities and obtain a better uniform sealing in spite of surface discontinuities.

The clad metal gasket ring has a number of advantages for high pressure boiler liquid level gauge windows.

The cladding forms an impervious wall on the pressure side of the gasket and prevents seepage of the fluid into the gasket section. This sharply limits the port area exposed to pressure and maintains a greater margin of initially applied pressure on the window for positive sealing.

The density of the sealing pressure wall and its impervious nature prevents the previously experienced seepage of the fluid into the porous structure of conventional gasket materials and thus prevents initiation of leakage.

The combination of the thin metallic jacket with a core of heat-resisting fibrous cushioning material permits deformation of the metal jacket to conform to the sealing surfaces without excessively high sealing pressure and results in a very tight boundary seal. Initial tests have shown that the seal is far superior to previous practice.

The stresses introduced by the combination particularly when used with the Belleville spring means forms a seal against the mica or the glass. There is no noticeable tendency to warp the mica.

The gasket of the invention is adapted to be used in a pressured seal type groove of the type of U.S. Patent No. 2,201,542, and easily conforms to the pressure sealed section from an original round or oval form without developing section discontinuities or local surface wrinkles of the cladding material.

The gasket ring of the invention is strong in shear over the clearance area between the outer periphery of the glass and the body material surrounding the gasket groove. The increased shear strength of the body permits increase in the clearance dimension up to two or three times the thickness of the cladding without danger of failure through blowout.

The containment of the core material of the gasket by the jacketing material serves to combine the jacket within its original designed dimensions and thus greatly increases the sealing pressure on the gasket and the efficiency of the seals. This eliminates the normal peak experienced with conventional packing material.

The cladding seam is preferably provided at 77 on the middle of the semicircular cross section, although it will be evident that the seam can be located at other positions on the gasket ring as desired.

In view of our invention and disclosure variations and modifications to meet individual whim or particular need will doubtless become evident to others skilled in the art, to obtain all or part of the benefits of my invention without copying the structure shown, and we, therefore, claim all such insofar as they fall within the reasonable spirit and scope of our claim.

Having thus described our invention what we claim as new and desire to secure by Letters Patent is:

1. A window unit for a liquid level gauge comprising a cover having a flanged window recess, Belleville spring means in the recess, a transparent window element on the side of the Belleville spring means remote from the flange, spring means surrounding the window element engaging the window element at the outside and extending outward and engaging the wall of the recess in the cover, the spring means holding the window element centered and holding the window element and Belleville spring means in assembly.

2. A windoy unit of claim 1, in combination with a gasket ring on the side of the window element remote from the Belleville spring means and a retainer ring surrounding and engaging the window element and extending radially inwardly over at least 40 percent of the radial dimension of the gasket ring, the retainer ring being of sheet metal of thickness between 0.0005 and 0.005 inch.

3. A window assembly of claim 2, in which the gasket ring has a flat surface engaging the window element and a surface curved in cross section remote therefrom, and the retainer ring conforms to the curvature of the surface of the gasket remote from the window element.

4. A window unit of claim 2, in which the gasket comprises a heat resisting fibrous cushioning material and a metallic envelope.

5. A window unit of claim 4, in which the gasket ring has a coating on the metallic envelope of a relatively softer metal.

6. A liquid level gauge having a body provided with a space for steam and water and having a window opening, and having a circular window recess at the outside of the window opening, and provided with an annular packing engaging surface at the bottom of the window recess around the window opening, a window assembly unit insertable and removable as a unit from the window recess including a circular window element, a gasket ring on the side of the window toward the packing engaging surface, and a spring metallic retaining ring surrounding and engaging the outside of the window element and having a flat like portion which extends over the packing surface between the gasket ring and the packing surface inwardly over at least 40% of the radial dimension of the gasket ring on the side of the gasket ring remote from the window element, the spring retaining ring having a thickness of between 0.0005 and 0.005 inch, a cover having a viewing opening surrounding the outside of the window unit, Belleville spring means interposed between the cover and the outside of the window element, and means securing the cover to the gauge body, the Belleville spring means exerting spring pressure on the window element which is in turn exerted on the gasket ring and by the gasket ring is exerted against the spring retaining ring to seal with respect to the packing surface of the body.

7. A liquid level gauge comprising a gauge body having an interior space for water and steam and a window opening communicating with said interior space, having a window recess at the outside of the window opening, and having an annular packing surface at the bottom of the window recess around the window opening, in combination with a window assembly unit insertable and removable bodily as a unit and positioned in the window recess, said window assembly unit including a glass window disc, a mica sheet on the side of said window disc toward the interior of the gauge, a gasket ring having a flat surface engaging the mica sheet and having a surface curved in cross section remote from the mica sheet and toward the interior of the gauge, a metallic spring retaining ring surrounding and engaging the window disc, extending around the mica sheet and the gasket ring toward the interior of the gauge and having a portion of curved cross section which extends over the portion of the gasket ring of curved cross section and engages in the packing surface of the body, said spring retaining ring extending inwardly over at least 40% of the radial dimension of the gasket ring on the side of the gasket ring toward the interior of the gauge and said spring retaining ring having a thickness of between 0.0005 and 0.005 inch, a gauge cover having a side opening surrounding the window unit at the outside, Belleville spring means interposed between the cover and the outside of the gauge glass, and means for securing the cover to the body, the Belleville spring means exerting pressure through the glass disc, and through the sheet of mica to the gasket ring which in turn exerts sealing pressure against the portion of the retaining ring which is interposed between the gasket ring and the packing surface of the body.

8. A liquid level gauge of claim 7, in combination with a spacing spring surrounding the glass disc, secured to the cover, and holding the glass disc centered with respect to the cover.

9. A liquid level gauge of claim 7, in which the retaining ring extends over at least 80% of the radial dimension of the gasket ring.

10. A liquid level gauge comprising a gauge body having a space for water and steam, having a window opening and having a window recess at the outside of the window opening, there being an annular packing surface around the window opening at the bottom of the window recess, a window assembly unit insertable and removable as a unit from the window recess comprising a glass disc, a mica sheet on the side of the glass disc toward the interior of the gauge, a gasket ring on the side of the mica sheet toward the interior of the gauge, the gasket ring being flat on the side toward the mica sheet and curved in cross section on the side toward the packing surface, the gasket ring having a body of fibrous heat-resisting cushioning material and a sheet metal envelope having a thickness between 0.0005 and 0.005 inch, the gasket ring at the outside having an adhering layer of relatively softer metal than the metal of the ring, and a spring retaining ring surrounding and engaging the glass disc and extending toward the interior of the gauge around the mica sheet and around and inwardly over at least 40% of the radial dimension of the gasket ring on the side of the gasket ring toward the packing surface, the spring retaining ring comprising sheet metal of a thickness between 0.0005 and 0.005 inch, in combination with a cover surrounding the glass disc on the outside of the body, Belleville spring means acting between the cover and the glass disc and means for securing the cover to the body, the Belleville spring means applying sealing pressure to the glass disc and the mica body and thence to the packing ring against the inwardly extending portion of the metal retainer.

References Cited in the file of this patent

UNITED STATES PATENTS

| | | |
|---|---|---|
| 1,731,404 | Wetherill | Oct. 15, 1929 |
| 1,872,709 | Ernst | Aug. 23, 1932 |
| 2,215,570 | Sylvander | Sept. 24, 1940 |
| 2,368,105 | Berge | Jan. 30, 1945 |
| 2,484,693 | De Witt | Oct. 11, 1949 |
| 2,757,632 | Wittlin | Aug. 7, 1956 |
| 2,773,387 | Miller | Dec. 11, 1956 |

FOREIGN PATENTS

| | | |
|---|---|---|
| 111,729 | Sweden | Sept. 5, 1944 |
| 923,093 | Germany | Feb. 3, 1955 |